United States Patent
Isnardi (10) Patent No.: US 6,771,795 B1
(45) Date of Patent: Aug. 3, 2004

(54) SPATIO-TEMPORAL CHANNEL FOR IMAGE WATERMARKS OR DATA

(75) Inventor: Michael A. Isnardi, Plainsboro, NJ (US)

(73) Assignee: Sarnoff Corporation, Princeton, NJ (US)

( * ) Notice: Subject to any disclaimer, the term of this patent is extended or adjusted under 35 U.S.C. 154(b) by 818 days.

(21) Appl. No.: 09/656,892

(22) Filed: Sep. 7, 2000

(51) Int. Cl.$^7$ ................................................ H04K 1/00
(52) U.S. Cl. .................................... 382/100; 348/463
(58) Field of Search ....................... 713/176; 382/100, 382/232; 348/461, 463, 465, 467; 380/210, 287, 54

(56) References Cited

U.S. PATENT DOCUMENTS

| | | | | |
|---|---|---|---|---|
| 6,094,722 A | * | 7/2000 | Astola et al. ................ | 713/176 |
| 6,211,919 B1 | * | 4/2001 | Zink et al. ................... | 348/473 |
| 6,381,367 B1 | * | 4/2002 | Ryan .......................... | 382/232 |
| 6,594,373 B1 | * | 7/2003 | Gustafson .................... | 382/100 |
| 6,636,638 B1 | * | 10/2003 | Yamaguchi .................. | 382/232 |

FOREIGN PATENT DOCUMENTS

WO          WO 96/06503 A1 *   2/1996    ............ H04N/7/08

OTHER PUBLICATIONS

Szepanski, "Binärdatenübertragung über Videokanäle mit Datensignalen sehr geringer Amplitude," *FERNSEH– und KINO– TECHNIK,* vol. 32, No. 7, 1978, pp 251–256 (with English translation).*

Szepanski, "Additive Binärdatenübertragung für Videosignale," *NTG–Fachberichte,* vol. 74, 1980, pp. 343–351 (with English translation).*

Dittmann et al., "A new approach for transformation invariant image and video watermarking in the spatial domain: SSP—self spanning patterns," *Proc. SPIE vol. 3971: Security and Watermarking of Multimedia Contents II,* Jan. 2000, pp. 176–185.*

* cited by examiner

*Primary Examiner*—Andrew W. Johns
(74) *Attorney, Agent, or Firm*—William J. Burke, Esq.

(57) ABSTRACT

A channel is inserted into a sequence of frames for an image, by varying one or more display characteristics of the resulting image across the display. The watermark and other data channel may be employed to watermark the video signal, and the watermark may correspond to the presence of the channel or may be data in accordance with watermark information carried within the channel. For most display devices, display variations are minimized during the design process, but human viewers may still tolerate and accept subtle variations in a displayed image. For exemplary embodiments in accordance with the present invention, slightly changing one or more display characteristics from center-to-side in accordance with watermark information allows for watermarking of the image since viewers may not be aware that display characteristics are changing. For example, a tapering function may be used in a transmitter to vary one or more color components of the video signal representing the image. A receiver includes a watermark detector that has a priori information about the watermark. The watermark detector examines specific regions of the displayed image over time, and tests the regions for the watermark during time intervals when the image remains relatively still. A histogram of each color component of the region may be generated, and the watermark detected by comparing the histograms for the watermarked and non-watermarked color components. The watermark is detected if the histogram of the watermarked color component varies in manner related to the tapering function. Watermarking of the image in this manner is robust to subsequent signal processing methods, such as scaling, cropping, rotation, and compression.

28 Claims, 4 Drawing Sheets

SPATIO-TEMPORAL CHANNEL FOR IMAGE WATERMARKS OR DATA

BACKGROUND OF THE INVENTION

1. Field of the Invention

The present invention relates to image processing, and, more particularly, to a channel for data transmission in, or watermarking of, video signals.

2. Description of the Related Art

Image information is commonly recorded or stored in either analog or digital format, but ultimately any information recorded in an analog format may be translated into a digital format. Once in digital format, such information is easily copied, modified, or distributed through electronic media such as the Internet. While protection by copyright is available to owners of the information once fixed in tangible media, theft through unauthorized copying, modification, or distribution of the information in digital format is easily accomplished and is difficult to detect from the information itself. For example, theft of compressed digital content (e.g., digital video disk (DVD), digital broadcast, or digital cinema) is a serious concern to owners of, and providers authorized to distribute, the compressed digital content. While the nature of the digital format allows for "perfect" copies of the compressed digital content, techniques exist to hide information within the compressed digital content that may be used to prove rightful ownership or use, such as in a court of law.

Collectively, these techniques are within the field of data verification, and for encoded and/or compressed digital image content, digital watermarking is commonly employed to insert hidden information into the content directly into the image video signal. Many watermarking techniques for digital images have been developed that allow content providers to prove the origin of their material and that their material was copied, modified, or distributed. In addition, published techniques exist for inserting invisible watermarks into video data, and the Copy Protection Technical Working Group (CPTWG) of the DVD forum, for instance, may select a standardized digital watermarking technique for DVD's.

For some systems, a separate data channel superimposed on the transmitted video signal may aid in data verification. The data channel may be added within the encoded packet stream itself or sent separately in secondary channels used for, for example, system, signaling, and synchronization information. In either case, the channel may be used to carry data corresponding to an encryption key, watermark pattern, or other form of watermark information.

In many of the techniques for encoded or compressed digital images, the watermark is "stamped" into the image by modifying or otherwise performing operations on either pixels or selected bit values of the pixels (termed the "pixel domain"). However, since these techniques work directly on the signal (e.g., compressed digital image) itself, they may either 1) distort the image, 2) be rendered useless by "perfect" copying, or 3) be lost by legitimate signal processing operations during transport of the image (e.g., compressed data transport or storage). Techniques for inserting watermarks in the pixel domain are generally not robust to common image signal processing methods, such as scaling, cropping, rotation, and compression, of the digital image information. Furthermore, techniques designed to provide higher bit rates for hidden data signals of the watermark tend to be more visible in the watermarked image and/or less robust to subsequent signal processing.

For example, some pixel-domain watermarking techniques exploit a human's insensitivity to high spatial and/or temporal frequencies, and insert low-level watermarks with these characteristics. Unfortunately, the watermarks of these techniques tend to be degraded or obliterated completely when the image is resized (specifically, reduced in size) or compressed by commonly used algorithms such as those specified in the MPEG-1 or MPEG-2 standards. Furthermore, the rapid variations associated with the watermark are often interpreted as noise by signal processing algorithms encoding or compressing the image data, which tends to lower the efficiency of compression algorithms. Other pixel-domain watermarking techniques specifically target edges of objects in the image as a means for inserting a watermark or hiding data. However, since data compression algorithms such as those employed in MPEG-2 systems introduce noise at object edges, a similar degradation or obliteration of the watermark may occur.

SUMMARY OF THE INVENTION

The present invention relates to a channel allowing for watermarking of an image or data transmission within an image that is robust to subsequent signal processing methods, such as scaling, cropping, rotation, and compression. The presence of the channel itself may be considered as the watermark, or the watermark may be represented by data carried in the channel. The channel is inserted into the image by varying display characteristics of the image across at least one or more regions of the display in accordance with a known function. Variation of a display characteristic for preferred embodiments may be a spatial variation that varies with time based on a known spatio-temporal function. Examples of such display characteristics are center-to-side 1) brightness falloff and 2) resolution reduction. For most display devices, although attempts may be made to reduce or eliminate display variations, human viewers may tolerate and accept these subtle variations in a displayed image. For exemplary embodiments in accordance with the present invention, slightly changing one or more display characteristics from center-to-side in accordance with a predefined function allows for the channel within the image since viewers may not be aware that the display characteristics are changing.

In accordance with one embodiment of the present invention, watermark information is encoded into a video signal. The watermark information is encoded by: (a) applying a spatial function to one or more components of the video signal to vary a display characteristic over at least one region of a frame of the video signal; (b) varying the spatial function based on the watermark information; and (c) repeating (a) and (b) for one or more additional frames of the video signal to encode the watermark information into the video signal.

In accordance with another embodiment of the present invention, watermark information in a video signal is detected. The watermark information is detected by: (a) generating a measure between frames of the video signal for one or more components in one or more regions; (b) determining whether one or more regions are still based on the generated measure; and (c) detecting a variation in a sub-set of the components for each region that is still, the variation representing the watermark information.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with embodiments of the present invention, a channel is inserted into an image by varying a display characteristic of the data representing the image. The channel may be a signal that corresponds to, for example, a display characteristic varying in accordance with 1) a predefined mathematical function or waveform shape; 2) a signal modulated by a sequence of states, 3) an analog or digital cyclic pattern, or 4) a random or pseudorandom pattern corresponding to an identification key. The display characteristic is varied in a manner that is relatively robust when the image is subjected to moderate signal processing, such as scaling, rotation, cropping, and/or compression of the image. For the preferred embodiments described herein, the channel is described for the purpose of applying watermark information to the image, although the present invention is not so limited and may be employed to provide a separate data channel. The mere presence of the channel may be considered as a watermark, or data carried within the channel may correspond to watermark information. For the described preferred embodiments, a display characteristic of the image is varied from center to side in a fashion that is difficult to detect visually by a human but may be detected by a processor based on a priori knowledge about the watermark. The watermark information, when extracted at a receiver, may be used to identify the origin of the image data, ownership of the image data, or whether the image data is modified or otherwise corrupted. In addition to image origination and verification systems, the present invention may be applied to systems for copy management, advertisement integrity, or steerable encoding.

As described herein, the function forming the channel is applied to a video signal comprising a sequence of frames. The sequence of frames, when displayed, forms an image displayed over time, and for the described, preferred embodiments, the term "image" refers to an image that may remain still or may change over time. The term "still image" refers to an image formed from a sequence of frames in which there is little or no movement. The term "moving image" refers to an image formed from a sequence of frames in which objects within regions of the image change substantially over time. One skilled in the art would realize that use of these terms is for clarity, and use of these terms in the following description does not limit the present invention.

Figure 1:
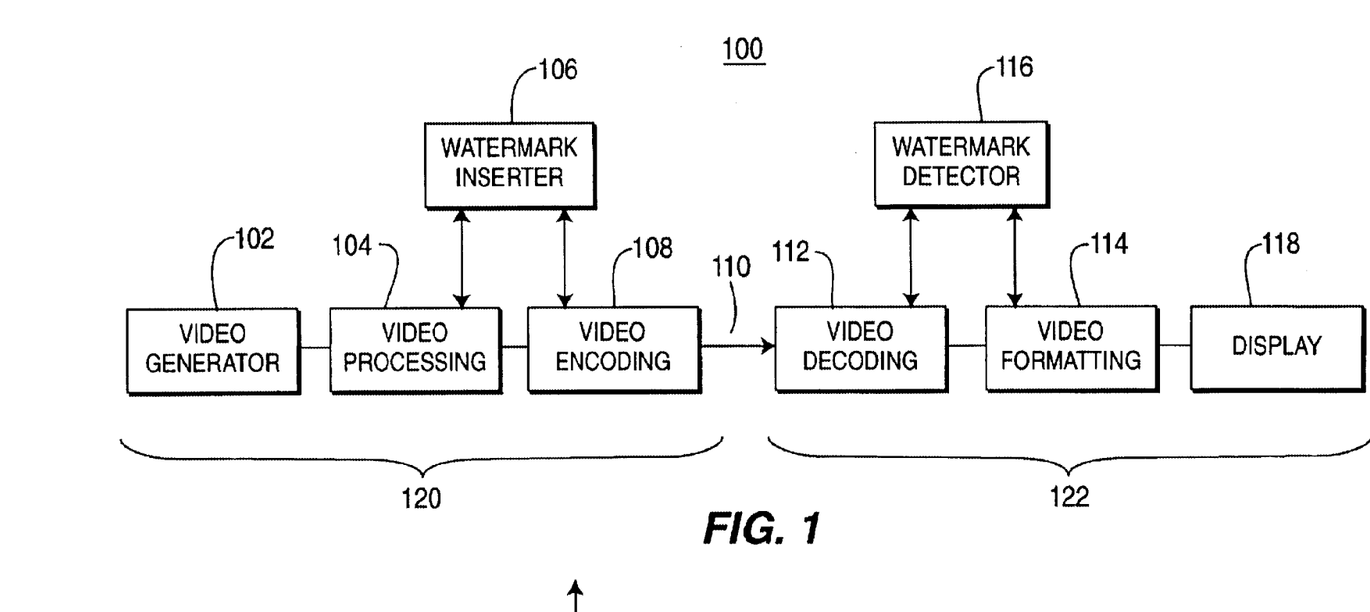
FIG. 1 shows a video system that inserts and detects watermarks in accordance with exemplary embodiments of the present invention.

FIG. 1 shows a video system 100 that inserts and detects watermarks in accordance with exemplary embodiments of the present invention. Video system 100 includes i) transmitter 120 generating video signals with a channel formed in accordance with exemplary embodiments of the present invention for watermarking an image, and ii) receiver 122 detecting the watermark in a received video signal.

Video generator 102 of transmitter 120 may be a video camera, IR camera, UV camera, computer, or similar device configured to generate a video signal representing a recorded image. Video generator 102 may scan the image to generate a video signal of frames comprising multispectral (e.g., red, green, and blue [RGB]) components of pixels representing the scanned image. The video signal is provided to a video processing module 104. Video processing module 104 may provide signal processing, either in the analog or digital domain, that samples the video, compensates for variations that arise during scanning, or performs similar types of image processing known in the art. Video encoding module 108 may be employed to generate compressed or encoded video signals in accordance with, for example, compressed digital video standards such as MPEG-2. Watermark inserter 106 is coupled to one or both of the video processing and video encoding modules 106 and 108 to insert a channel for watermark information into the image represented by the video signal. Watermark inserter 106 modifies, for example, one or more of the RGB components of pixels of the image as described subsequently. While the following describes modifying one or more of the RGB components, one skilled in the art would realize that other signal components, such as the Y, U/V, Cr/Cb, or Pr/Pb components (or other components derived from the multispectral components of the video signal) may be modified.

As is known in the art, both electronic displays and film projectors tend to have display characteristics that vary from the center to the sides of the image. Display characteristics such as center-to-side 1) brightness, falloff and 2) resolution reduction are common in both optical projectors and direct-view cathode-ray tubes (CRTs). Electronic projectors and CRTs may also exhibit RGB registration variations of pixels from center-to-side. When designing video generation and display systems, the variations from center-to-side are preferably minimized, but it is relatively difficult if not impossible to completely eliminate them. However, a human's visual perception is such that most humans observing the image tolerate and accept these subtle variations. Because the changes in the display characteristic(s) from center-to-side are slight, most viewers are not aware when a display characteristic changes over time.

Figure 2:
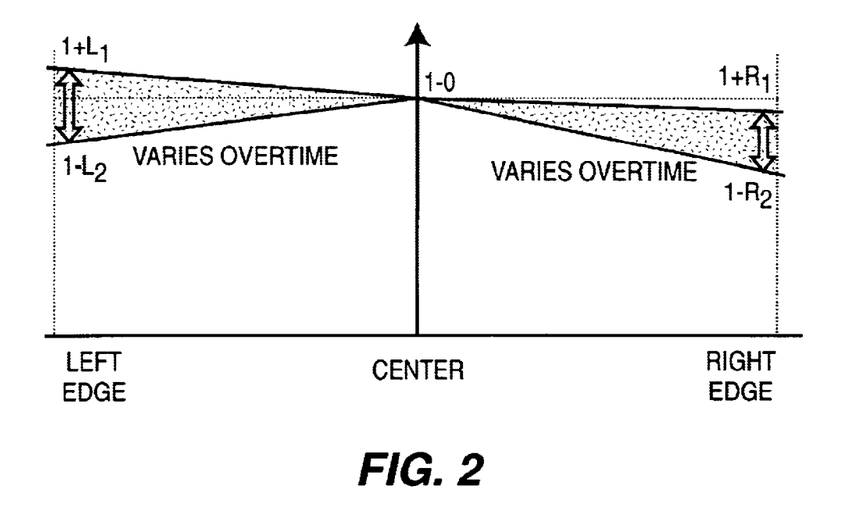
FIG. 2 shows a time-varying taper function applied to one or more components of an image from center-to-side.

In one exemplary embodiment of the invention, to form the channel one or more color components of the video signal are slowly tapered from center-to-side, and the tapering function itself varies slowly over time. The presence of the channel itself in the image may be considered the watermark. In addition, watermark information may be related in a predefined or otherwise known manner to either the tapering function itself, modulation of the tapering function over time, or a combination of both to insert the watermark. An example of a time-varying tapering function used by the watermark inserter 106 to watermark the video signal is shown in FIG. 2.

The tapering function may be used to scale the pixel values in, for example, the horizontal direction. In other words, the tapering function may be employed as a multiplicative function in which all pixels in each column are equally weighted by the same tapering function value), changing the contrast of the image in the weighted region. In another implementation, the tapering function may be used to define a fixed offset added to or subtracted from the pixel values (i.e., as an additive function in which all pixels in each column are equally offset by the tapering function value), changing the relative brightness of the image in the weighted region. As shown in FIG. 2, it may be possible for the maximum pixel value to be exceeded (saturated) if either scaling or addition of pixel values by the tapering function is employed. Methods to account for this saturation may be 1) fixed scaling of all pixel values for the entire image prior to applying the tapering function; or 2) allowing hard-limiting (saturation) by the maximum value if such saturation occurs relatively infrequently.

The following describes preferred embodiments of the present invention in which the tapering function is used to scale pixel values. The pixel values for at least one of the components (e.g., the blue component) are weighted in accordance with the corresponding value of the time-varying tapering function of FIG. 2. Applying the tapering function to one or more components changes the contrast across the image in a linear fashion from, for example, 1.0 (arbitrary, normalized units) in the center of the image to a number in the range $(1-L_2, 1+L_1)$ at the left edge of the image. Similarly, the contrast changes in a linear fashion from 1.0 in the center to a number in the range $(1-R_2, 1+R_1)$ at the right edge of the image. The values of $L_1$, $L_2$, $R_1$ and $R_2$ are not necessarily equivalent and one or more may be zero. Specific values for $L_1$, $L_2$, $R_1$ and $R_2$ may be selected as relatively small (e.g. between −0.1 and 0.1) to avoid detection by an observer of the image.

For preferred embodiments, the change in color information is relatively small near the center of the image (where most of the action of objects in the image happens), and more pronounced near the left and right edges, where less action happens and where the human eye is more tolerant of variations. The gradual change from the center toward the edges may be preferred to minimize detection of the varying display characteristic by human vision. However, one skilled in the art would recognize that other changes may be possible, such as no change or a constant change from the center toward the edge until a predefined point (pixel), followed by a change based on a spatio-temporal function.

Over time, the values at the corresponding extreme left and right edges vary over the ranges $(1-L_2, 1+L_1)$ and $(1-R_2, 1+R_1)$, respectively, with spatial linear interpolation between the center and each edge. For example, at time t=0, the value at the left edge might be $(1-L_2)$. Between t=0 and t=1 second, the value at the left edge may increase in some fashion (e.g. linearly or sinusoidally) to the higher value, $(1+L_1)$, and in the following second may fall back to the value $(1-L_2)$. In the exemplary implementation described herein, the contrast change goes through one complete cycle every two seconds. One skilled in the art would readily recognize that other implementations for watermarking images may be possible. The cycle may be fixed, made shorter or longer, or modulated with a data signal. In addition, the spatial or temporal aspect of the tapering function may be non-linear, or the tapering function may vary such that center-to-left taper may have a temporal period different from the temporal period of the center-to-right taper.

One skilled in the art would also recognize that this technique may be applied to a single component or to several components of the video signal. For example, a human's visual perception is relatively insensitive to variations in the blue component of the video signal. For the described implementation of the exemplary embodiment, a tapering function such as shown in FIG. 2 is applied to the blue component of the video signal to subtly change the hue of the color information. Consequently, the perceived hue of the color information (specifically, the "bluishness") changes both slowly from center to edge and slowly over time. Another implementation applies a tapering function to weight the color components to subtly change the vividness or saturation of the color information both slowly from center to edge and slowly over time.

One skilled in the art would recognize that the same time-varying spatial tapering technique may be applied to the top and bottom edges of the image instead of the left and right. Also, if a rectangular region in the center is defined as an area with unity gain, it is possible to apply both tapers in each cardinal direction simultaneously, in which case a different tapering function may be applied to the top, left, bottom, and right edges of the image.

Returning to FIG. 1, receiver 122 of system 100 receives signal 110 representing the watermarked video signal generated by transmitter 120, and then may decode the video signal with video decoding module 112. Video decoding module 112 may be used to reconstruct data representing the video signal from a packet stream, reverse digital line encoding and/or compression, and format the image in accordance with a standard, such as the MPEG-2 standard. Further digital/analog processing of the reconstructed, watermarked image (e.g., formatting, cropping, rotation, and/or color information modification) may be performed by video formatting module 114 prior to providing the video signal to display 118. Display 118 may be a standard optical projector, electronic projector, or CRT converting the color information in the video signal to pixels on the screen of display 118 to provide the image to a viewer.

Receiver 122 includes watermark detector 116 to detect the (watermark) channel of a received video signal for, for example, demodulation of data in the channel and verification of both the origin and integrity of the received image. Since the channel is inserted as an operation over both space and time, watermark detector 116 may employ techniques based on a priori knowledge about the channel function to detect the presence, absence, or modification of the watermark.

Detecting the presence of a tapering function in one or more components is more difficult when objects in the image are moving in time, or the image is undergoing a zoom or pan in time. As would be apparent to one skilled in the art, many feature-length films, documentaries, commercials, and studio productions include image regions that remain relatively still for periods lasting for one or more seconds and that are distributed throughout the sequence of frames of the video signal. Consequently, detection of the watermark comprises two operations: 1) detection of a sequence of frames in which the moving image, or at least one or more regions in the moving image, remain relatively still; and 2) detecting the watermark itself within those regions of the image that are detected as being relatively still.

Figure 3:
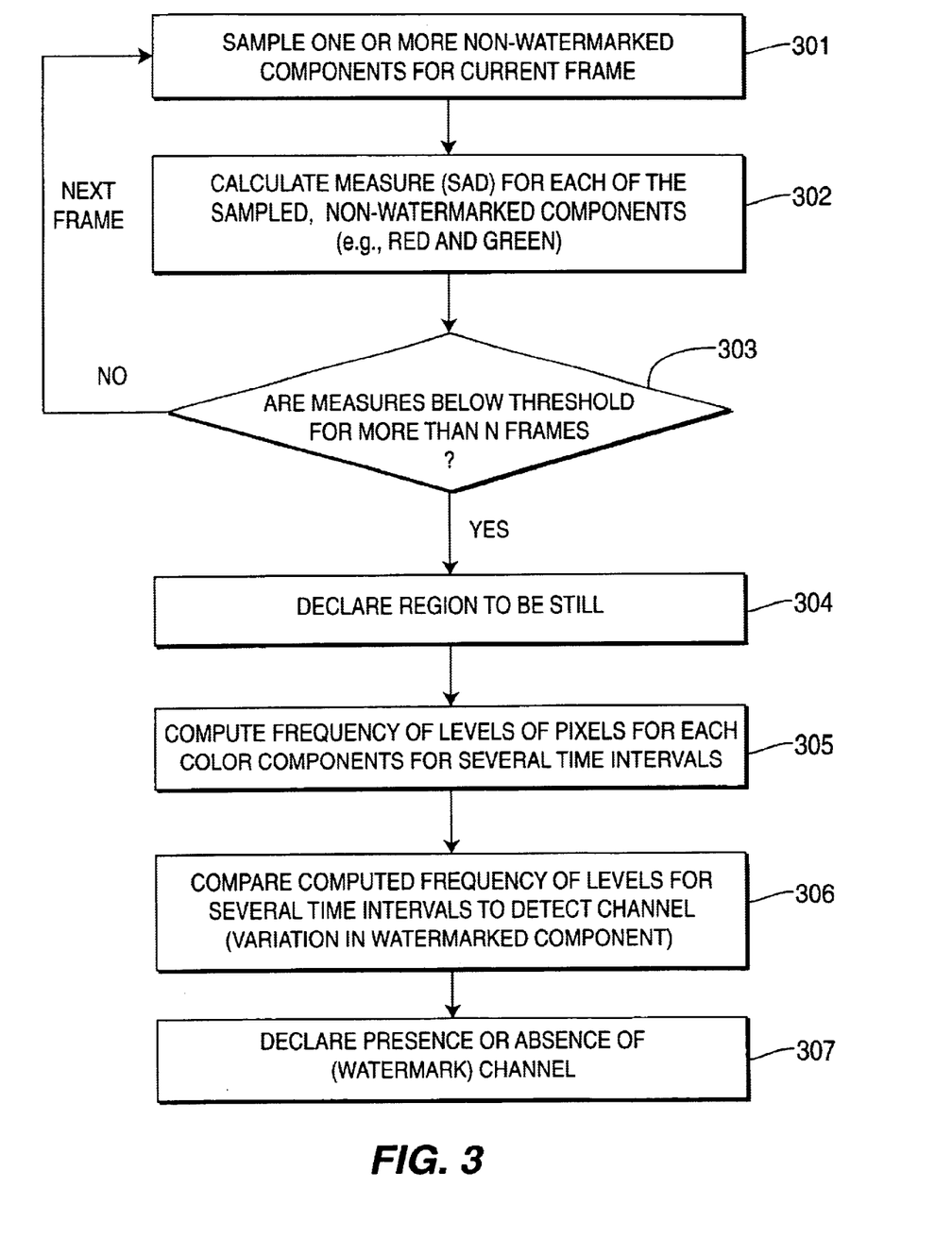
FIG. 3 shows an exemplary method for implementing detection of a channel by a receiver for the exemplary time-varying taper function of FIG. 2.

To detect whether regions of the image are relatively still, watermark detector 116 characterizes differences in the frame color information for pre-defined regions of the image between frames to determine whether they may be declared as being "still". Watermark detector 116 knows a priori which color components are watermarked and therefore characterizes inter-frame differences in the non-watermarked color component(s) for stillness determination by calculating the sum of absolute differences (SAD) (or other of differences) in values of the components between frames, which provides a measure of the relative rate of change of pixel values with the region. An exemplary method of watermark detection by watermark detector 116 is shown in FIG. 3.

Figure 4:
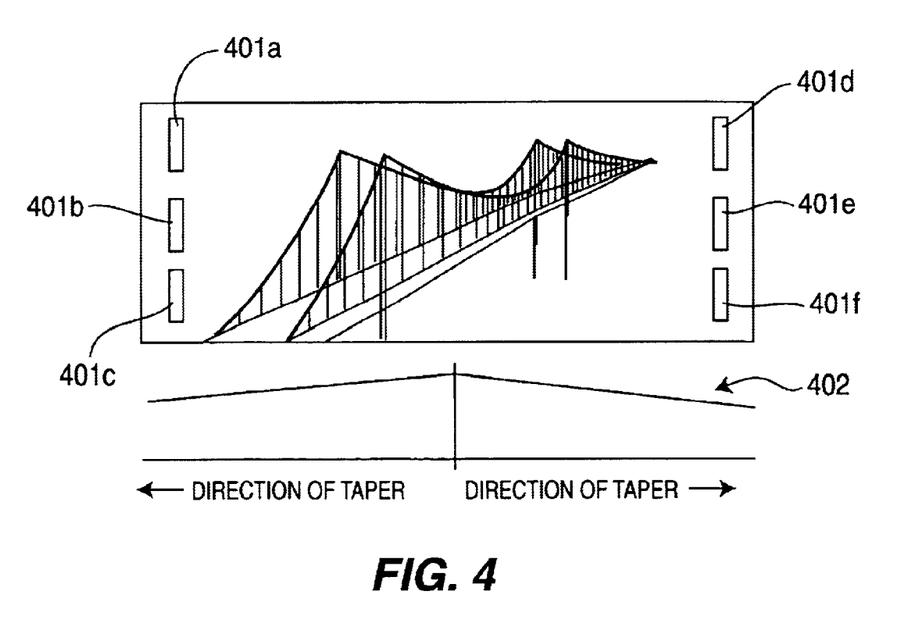
FIG. 4 shows analysis regions of an image watermarked in accordance with an exemplary embodiment of the present invention.

For example, at step 301 one or more non-watermarked color components (known a priori by the receiver as being non-watermarked) are sampled over a frame. At step 302, the SAD is calculated for the sampled, non-watermarked color components as a measure of "stillness" in the image. One skilled in the art would recognize that other measures may be employed. As shown in FIG. 4, several specific regions 401a–401c and 401d–401f along the left and right edges, respectively, of a watermarked image may be independently analyzed for stillness, as well as analyzed again later for detecting the presence or absence of the information representing the watermark. For the described embodiment, the non-watermarked color components (e.g., the green/red components for the exemplary implementation) are sampled in each frame and SAD values calculated between frames for each of the left and right regions 401a–401c and 401d–401f.

Returning to FIG. 3, at step 303 a test determines whether the SAD values remain below a threshold over a predetermined number of frames (e.g., N frames, N a positive integer). If the test of step 303 determines that the measure is not below the threshold or that fewer than N frames have been sampled, the method returns to step 301. If the test of step 303 determines that the measure is below the threshold for N consecutive frame, at step 304 the region is determined to be "still" (i.e., objects of the image region are moving slowly enough through time for accurate watermark detection).

For the second operation that detects the watermark itself, at step 305 the pixels in the one or more of the regions 401a–401c and 401d–401f that were determined to be "still" are examined to determine whether the tapering function (watermark) is present. As is known in the art, blue, red, and green color components of images tend to be highly correlated both spatially and temporally, so for most watermark detection events the red and green components remain relatively constant while the blue component varies over time. A histogram for one or more regions may be computed for each color component at different intervals over time to determine whether components change or remain relatively constant. For the histograms of the exemplary embodiment shown in FIG. 4, if the blue histogram for a region near the left edge of the picture stretches and shrinks over a 2-second period and the corresponding red and green histograms do not, then the watermark has been detected.

Figure 5:
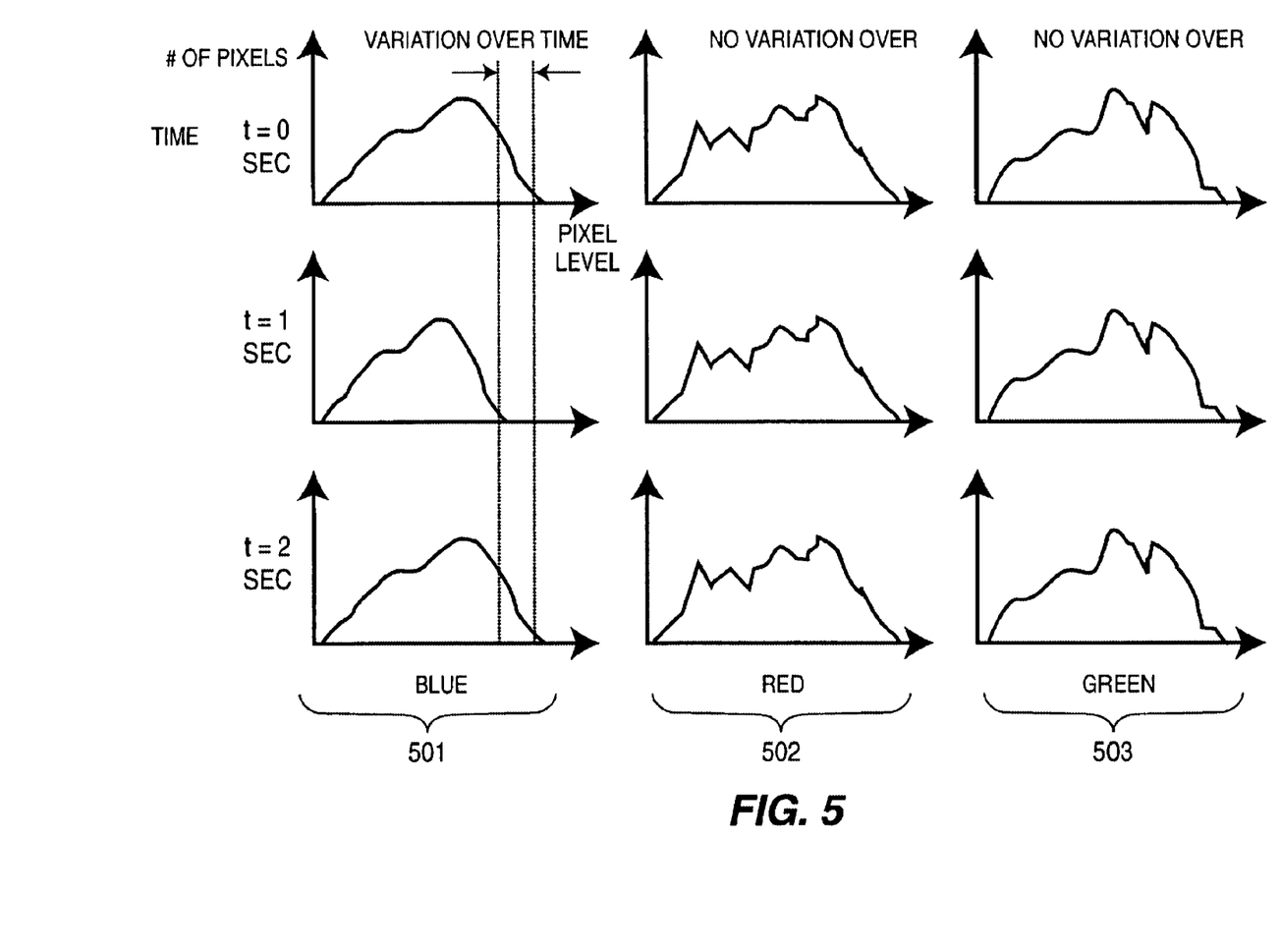
FIG. 5 shows histograms of red, blue, and green color components in edge regions of a video signal illustrating watermarking of the blue component in accordance with an exemplary embodiment of the present invention.

For example, if at step 304 the watermark detector 116 declares one of the regions 401a–401c and 401d–401f to be "still" based on characterization of the non-watermarked color components, at step 305 watermark detector 116 may generate histograms for the color components to compare the watermarked and non-watermarked color components. The histogram generated in step 305 for each watermarked color component may be created and stored in parallel to detection of "still" image regions or frames in steps 301–304. FIG. 5 shows blue, red, and green histograms 501, 502, and 503 of corresponding blue, red, and green color components in a region. The histogram may count the number of pixels in a sampled region for each possible pixel level or discrete groups of possible pixel levels. As shown in FIG. 5, the histogram of the blue color component varies over time (illustrating watermarking of the blue component in accordance with an exemplary embodiment of the present invention), while the histograms of the green and red color components remain relatively constant over time.

Although the height and width of the "stillness detection" regions may be arbitrary, it is advantageous for the histogram region to be a strict subset of this region and to be relatively short along the direction of the taper. For the example shown in FIG. 4, a histogram of the blue component is generated for the pixels in a relatively thin vertical strip (which thin vertical strip may be as small as one pixel wide) within the "stillness detection" region. Reducing the width of the histogram width along the taper direction tends to reduce the histogram variations produced by the taper itself, accentuating the differences between the untapered and tapered components.

Figure 6:
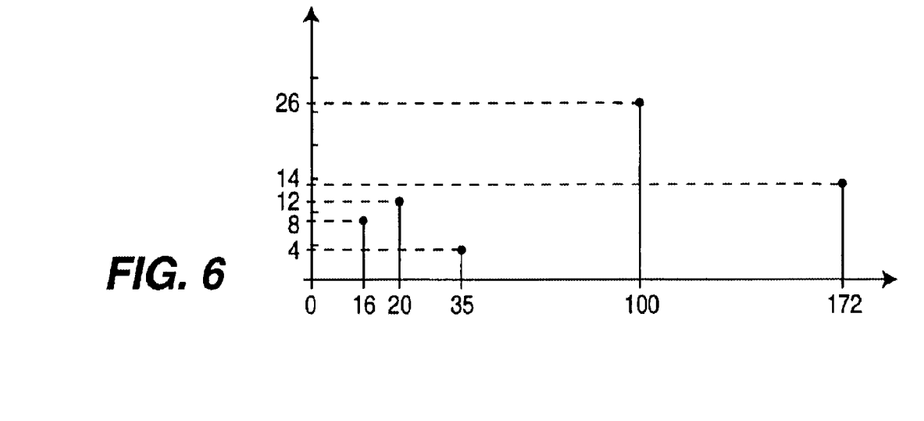
FIG. 6 shows a histogram generated for the blue component in a single histogram region.

For a video signal whose components are sampled with 8-bits amplitude resolution, a histogram for each histogram region is computed by counting the number of values at a particular level. For instance, if a blue histogram region of 64 pixels has the statistics given in Table 1:

TABLE 1

| Level | Count |
|---|---|
| 16 | 8 |
| 20 | 12 |
| 35 | 4 |
| 100 | 26 |
| 172 | 14 |
| All Other | 0 |

Then the histogram may be generated as shown in FIG. 6. To increase the confidence of detection, all pixels in all histogram regions corresponding to a single taper function (either left, right, or both left and right if the tapering characteristics are identical) are combined into a single histogram. To further increase the confidence of detection, the histogram may be monitored for the full duration of the "stillness" interval, which ideally should contain at least one temporal cycle of variation. All histogram values desirably undergo the same type of temporal variation and to the same degree, which may be verified by a separate process. For the example given in FIG. 6, if the 172 level is tapered (reduced) by 10% (to the value 155) after 15 frames, then all the other values should similarly be reduced by 10% after 15 frames. Quantization effects due to the 8-bit resolution should be accounted for when making this determination.

At step 306, the histograms for watermarked and non-watermarked components in the region are compared. For example, if a watermark is encoded in the blue color component, shown in FIG. 5 as histogram 501 for blue color component, the shape of the histogram for the watermarked color component varies over time (e.g., stretches and shrinks). For the time interval of a detection event, the histogram corresponding to the watermarked color component may vary in a manner that follows the time-varying nature of the tapering function used by watermark inserter 106. If the tapering function is used to vary scaling of the color component with time, the histogram over the region reflects the variation in scaling. During the same time interval of the detection event, the histograms of the corresponding non-watermarked color components may exhibit little or no variation. Based on the comparison of step 306, at step 307 the method declares that the watermark is either present or absent.

To reduce the rate of false positive decisions or false negative decisions, some implementations of the histogram analysis by watermark detector 116 may occur over several, and possibly all, still regions concurrently, with the results of detection for each of the regions then polled (e.g., polling of most or all of the histograms generated for regions 401a–401c and 401d–401f). For those implementations of watermarking in which the center-to-edge taper is relatively symmetrical (e.g., the left is always the mirror image of the right), then all edge regions declared as being still may be polled. For other implementations in which the left taper is independent of the right, the edge regions declared as still on the same side of the image may be polled.

In addition to, or instead of, applying the tapering function to a color component for watermarking of the image, embodiments of the present invention may add a data channel. Such data channel may include information of a second channel of data verification information, information about additional types of watermarks included in the image, or information to control downstream processing, or copyright, copy management or conditional access information.

The data bits of the data channel may modulate the tapering function during those time intervals in which the watermark detector will declare the image to be still. For this case, a transmitter such as transmitter 120 of FIG. 1 desirably includes a means for detecting still regions and then inserts the data channel by modulating the tapering function during the detected still regions. Consequently, watermark inserter 106, for example, may include a "stillness detector" similar to that used in the watermark detector 116 of receiver 122. An opportunity to insert data in an image having still regions during such a time interval is termed herein a "data interval". For example, implementations of the tapering function for watermarking described herein may be modulated by a data channel as follows.

In one implementation, the peak-to-peak range of the tapering function at the edges may be varied. For example, over different data intervals, the values for $L_1$ and $L_2$ of the left taper are varied. A logic "1" of a data value may be signaled by $L_1=0$ and $L_2=0.05$, and a logic "0" may be signaled by $L_1=0.05$ and $L_2=0$. A different binary pattern may be carried concurrently by the values of the right taper using a similar technique, providing two independent and parallel data channels.

In another implementation, the cycle time of the tapering function may be varied. A logic "1" of a data value may be signaled by a cycle time of 1 second (e.g., 24 film frames), and a logic "0" may be signaled by a cycle time of 2 seconds (e.g., 48 film frames). Here, too, the left and right tapering functions may have different and independent cycle times, providing two independent and parallel data channels.

In yet another implementation, the color component to which the watermark is applied may be varied. A logic "1" of a data value may be signaled by a tapered blue component and a logic "0" may be signaled by a tapered red component. During each data interval, one component at a time may be tapered, or both may be tapered concurrently. Tapering more than one color component concurrently may require careful design of the particular implementation since leaving a non-watermarked single component for the watermark detector to declare a region as "still" may allow for greater numbers of false decisions.

Watermarking in accordance with embodiments of the present invention may provide the following advantages as a relatively robust watermarking technique with respect to several types of signal processing transformations commonly applied to images. First, if the image is spatially resized (i.e., made larger or smaller), the relative percentage change of the watermarked color component's histogram stays the same. Thus, the watermark may be detected if the image is resized.

Second, if the image is cropped, the relative change in the watermarked color component's histogram is still present, but is less than expected. Thus, the watermark may be detected if the image is cropped. If the tapering function is known a priori and if the percentage change of the histogram is monitored at the extreme left and right column of pixels in the regions, a watermark detector may also determine how much cropping was applied to the image. However, if the taper only varies horizontally, then only horizontal cropping may be detected; vertical cropping would not be detected for this case.

Third, if the image is rotated, the percent variation at the extreme left and right edges may decrease as the angle of rotation of the image approaches 90°. When the angle of rotation of the image approaches 90°, no variation may be detected along the centerline. However, a watermark detector that simultaneously monitors all edges (top and bottom as well as left and right sides) of the image may detect such rotations and calculate the degree of rotation.

Fourth, monitoring percentage change in histograms of the color components may be employed to detect the watermark even if a (different) constant offset is added to each color component, or if a constant reduction or increase in contrast is applied to each component.

Fifth, the watermark may still be detected even when relatively small amounts of noise are added to the video signal so long as still regions may still be detected reliably after temporal noise reduction and the amplitude of the noise does not exceed the peak-to-peak variation in the watermark taper.

Sixth, block-based methods of image compression add little or no corruption of the watermark because the watermark is nearly uniform over each block. It is well-known in the art of signal processing that DC levels are well preserved in block-based image and video compression schemes, and are well-preserved in any compression scheme (block-based or not) in which DC and very low spatio-temporal frequencies are preserved.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for encoding watermark information into a video signal, the method comprising the steps of:
   (a) applying a spatial function to one or more components of the video signal to vary a display characteristic over at least one region of a frame of the video signal;

(b) varying the spatial function based on the watermark information; and (c) repeating steps (a) and (b) for one or more additional frames of the video signal to encode the watermark information into the video signal.

2. The invention of claim 1, wherein, for step a), the spatial function specifies weighting that is applied to image pixels as either a scaling factor or an additive offset.

3. The invention of claim 2, wherein, for step a), the spatial function is a tapering function.

4. The invention of claim 1, wherein, for step a) the spatial function is applied from the center to one or more of the top, bottom, left, and right edges of the image.

5. The invention of claim 1, wherein, for step b), the watermark information either 1) modulates a peak-to-peak range of the spatial function; 2) modulates a cycle time of the spatial function; or, 3) varies a color component that is varied by the spatial function.

6. The invention of claim 1, further comprising the step of detecting whether a region is still over multiple frames, and step b) varies the display characteristic of the video signal when the region is still.

7. A method of detecting watermark information in a video signal, the method comprising the steps of:

(a) generating a measure between frames of the video signal for one or more components in one or more regions;

(b) determining whether one or more regions are still based on the generated measure; and (c) detecting a variation in a sub-set of the components for each region that is still, the variation representing the watermark information.

8. The invention of claim 7, wherein the watermark information is inserted in the video signal by the steps of:

(1) applying a spatial function to one or more components of the video signal to vary a display characteristic over at least one region of a frame of the video signal;

(2) varying the spatial function based on the watermark information; and (3) repeating steps (1) and (2) for one or more additional frames of the video signal to encode the watermark information into the video signal.

9. The invention of claim 8, wherein the spatial function is a tapering function.

10. The invention of claim 7, wherein, for step a), the measure is a relative difference between frames of corresponding pixels in each region.

11. The invention of claim 7, wherein, for step a), the measure is a sum of absolute differences.

12. The invention of claim 7, wherein, for step c), the variation is detected by detecting a variation in a component for a pixel while other components for the pixel remain relatively constant.

13. The invention of claim 12, wherein, for step c), the variation is detected by measuring a relative frequency of pixel component values over time for a plurality of frames.

14. The invention of claim 7, further comprising the step of recovering the watermark information based on the variation.

15. Apparatus for encoding watermark information into a video signal, the apparatus comprising:

a watermark inserter including a function generator applying a spatial function to one or more components of the video signal to vary a display characteristic over at least one region of a frame of the video signal, a processor varying the spatial function based on the watermark information, wherein the function generator applies and the processor varies the spatial function for one or more additional frames of the video signal to encode the watermark information into the video signal.

16. The invention of claim 15, wherein the spatial function specifies weighting that the function generator applies to image pixels as either a scaling factor or an additive offset.

17. The invention of claim 16, wherein the spatial function is a tapering function.

18. The invention of claim 15, wherein the spatial function is applied by the function generator from the center to one or more of the top, bottom, left, and right edges of the image.

19. The invention of claim 15, wherein the processor modulates, based on watermark information, 1) a cycle time of the spatial function; 2) a peak-to-peak range of the spatial function; or 3) a varied by the spatial function color component.

20. The invention of claim 15, further comprising stillness detector detecting whether a region is still over multiple frames, the watermark inserter varies the display characteristic of the video signal when the region is still.

21. Apparatus for detecting watermark information in a video signal, the apparatus comprising:

a measure calculator generating a measure between frames of the video signal for one or more components in one or more regions;

a threshold detector determining whether one or more regions are still based on the generated measure and a threshold; and a variation detector detecting a variation in a sub-set of the components for each region that is still, the variation representing the watermark information.

22. The invention of claim 21, wherein the watermark information is inserted in the video signal by:

(1) applying a spatial function to one or more components of the video signal to vary a display characteristic over at least one region of a frame of the video signal;

(2) varying the spatial function based on the watermark information; and (3) repeating steps (1) and (2) for one or more additional frames of the video signal to encode the watermark information into the video signal.

23. The invention of claim 22, wherein the spatial function is a tapering function.

24. The invention of claim 21, wherein the measure is a relative difference between frames of corresponding pixels in each region.

25. The invention of claim 21, wherein the measure is a sum of absolute differences.

26. The invention of claim 21, wherein the variation is detected by detecting a variation in a component for a pixel while other components for the pixel remain relatively constant.

27. The invention of claim 26, wherein the variation is detected by measuring a relative frequency of pixel component values over time for a plurality of frames.

28. The invention of claim 21, further a processor generating the watermark information based on the variation detected by the variation detector.

* * * * *